(12) United States Patent
Metzger

(10) Patent No.: US 8,006,575 B2
(45) Date of Patent: Aug. 30, 2011

(54) FORCE MEASURING DEVICE

(75) Inventor: Frank Metzger, Albstadt (DE)

(73) Assignee: BAG Bizerba Automotive GmbH, Balingen (DE)

( * ) Notice: Subject to any disclaimer, the term of this patent is extended or adjusted under 35 U.S.C. 154(b) by 199 days.

(21) Appl. No.: 12/535,728

(22) Filed: Aug. 5, 2009

(65) Prior Publication Data

US 2010/0037711 A1 Feb. 18, 2010

(30) Foreign Application Priority Data

Aug. 12, 2008 (DE) .................. 10 2008 039 410

(51) Int. Cl.
*G01L 1/04* (2006.01)
(52) U.S. Cl. .................................. 73/862.641
(58) Field of Classification Search .. 73/862.61–862.69, 73/862.641
See application file for complete search history.

(56) References Cited

U.S. PATENT DOCUMENTS

| | | | | |
|---|---|---|---|---|
| 3,785,210 A | * | 1/1974 | Muller | 73/459 |
| 5,355,715 A | * | 10/1994 | Rausche et al. | 73/1.15 |
| 7,222,545 B2 | | 5/2007 | Blakesley et al. | |
| 7,292,145 B2 | * | 11/2007 | Castle et al. | 340/545.6 |
| 2004/0050182 A1 | | 3/2004 | Dukart | |
| 2004/0212583 A1 | * | 10/2004 | Cobian | 345/156 |
| 2009/0056476 A1 | * | 3/2009 | Glass | 73/862.391 |

FOREIGN PATENT DOCUMENTS

| | | |
|---|---|---|
| DE | 2 413 760 | 11/1974 |
| DE | 44 29 312 | 2/1996 |
| DE | 102 42 251 | 3/2004 |
| JP | 11148510 | 6/1999 |
| WO | WO 2007/006364 | 1/2007 |

* cited by examiner

*Primary Examiner* — Max Noori
(74) *Attorney, Agent, or Firm* — Leydig, Voit & Mayer, Ltd.

(57) ABSTRACT

Force measuring device for measuring the force between a first element and a second element of an application, comprising a housing and a sensor arrangement, which is arranged in the housing, the sensor arrangement comprising a first part and a second part and the force between the first element and the second element determining a relative position between the first part and the second part, characterized by at least one spring element, which is positioned between the second element and a support region arranged on the housing, and is supported on the second element and the support region.

22 Claims, 6 Drawing Sheets

FORCE MEASURING DEVICE

The present disclosure relates to the subject matter disclosed in German application number 10 2008 039 410.6 of Aug. 12, 2008, which is incorporated herein by reference in its entirety and for all purposes.

BACKGROUND OF THE INVENTION

The invention relates to a force measuring device for measuring the force between a first element and a second element of an application, comprising a housing and a sensor arrangement, which is arranged in the housing, the sensor arrangement comprising a first part and a second part and the force between the first element and the second element determining a relative position between the first part and the second part.

Force measuring devices of this type are used, for example, in conjunction with seats, such as vehicle seats.

A force measuring device for measuring the force between a first element and a second element of an application, which comprises a force detector with a flexural element, is known from WO 2007/006364 A1. The force detector can be fixed on the first element, and a sleeve, which is connected to the flexural element by means of a connecting region and which at least partially surrounds the force detector, can be fixed to the second element, and a contact element for the second element is arranged on the sleeve. The contact element is a part which is separate from the sleeve and is fixed on the sleeve, it being possible to fix the contact element in different positions on the sleeve at least during the production of the force measuring device.

SUMMARY OF THE INVENTION

In accordance with the present invention, the force measuring device is improved in such a way that it can be produced in a simple manner and can be used universally.

In accordance with an embodiment of the invention, in the force measuring device at least one spring element is provided, which is positioned between the second element and a support region arranged on the housing and is supported on the second element and the support region.

The spring element forms a resilient spacer between the second element and the support region. In different applications, the second element may have different dimensions or in the same application, manufacturing tolerances may be present. Furthermore, depending on the application, different spacings of the first element and the second element may also be present. For example, vehicle seats of different manufacturers have different dimensions on components, on which a force measuring device is to be positioned. By providing the at least one spring element, different dimensions and spacings or tolerances of this type in the dimensions and spacings can be compensated. The spring element may be varied with respect to its dimensions by means of its resilient configuration and, in the process, in particular, may be compressed.

An optimized force-locking connection between the second element and the housing, while also achieving a tolerance compensation, may be achieved by the provision of the at least one spring element. In particular, a pressing of the force measuring device is not impaired by the provision of the at least one spring element.

Advantageously, the at least one spring element is configured as a ring which surrounds a housing region. As a result, a uniform contact pressure can easily be achieved and the spring element can be held securely against loss.

Advantageously, the housing region is at least partially an entry region into an opening of the second element. As a result, a corresponding tolerance compensation may easily be obtained.

It is furthermore advantageous if the support region is arranged on an exterior surface of the housing. As a result, the at least one spring element can easily be supported on the housing.

In particular, the support region is arranged on a lateral surface of the housing, so that the at least one spring element may be arranged surrounding the housing, for example.

It is correspondingly advantageous, if the support region is arranged surrounding the housing. A uniform introduction of force can thus be obtained with regard to the support.

It is furthermore advantageous if the support region has a contact face oriented transverse to a force direction of the at least one spring element. This produces an optimized support.

In one embodiment, the at least one spring element has a flat side for resting on the support region or the second element. As a result, a uniform contact pressure is obtained so the force measurement is minimally influenced by the at least one spring element.

It is quite particularly advantageous if the at least one spring element has a plurality of resilient fingers, which are arranged on a carrier. The spring element is configured to be resilient by means of the resilient fingers, i.e. the fingers provide the springs. As a result, the spring element may easily be resiliently configured as a spacer element.

The resilient fingers are formed in that they are arranged on resilient carriers and/or are resilient. The fingers are resiliently movable with respect to the carrier.

The fingers have a contact face for the second element or the support region, so that they can be correspondingly supported on the second element or the support region (corresponding to the arrangement of the at least one spring element).

It is advantageous, if the carrier is annular. As a result, it can be pushed, for example, onto the corresponding housing region.

It is furthermore advantageous, if the carrier has a first contact face for the support region or the second element, this first contact face preferably being a flat contact face.

It may furthermore be provided that the carrier has a second contact face, which is opposite to the first contact face, for the second element or the support region. The second contact face is then effective, if the fingers are moved into an outer position at the maximum acceptable force loading.

In particular, the fingers are ring segment-shaped, wherein, outside a connecting region with the carrier, they are preferably separated from the carrier radially and in the peripheral direction, in order to allow the possibility of a resilient movement.

The fingers are preferably resiliently movable between a first position, in which the at least one spring element has a maximum height, and at least one second position, in which the at least one spring element has a minimum height. This movement range defines the range of the possible tolerance compensation by means of the at least one spring element.

For example, the spacing between the maximum height and the minimum height is in the range between 6 mm and 0.5 mm.

It has proven to be advantageous for applications, in particular in vehicle seats, if the at least one spring element has a spring constant in the range between $0.1 \times 10^5$ N/m and $20 \times 10^5$ N/m.

It is advantageous if the at least one spring element is produced from a plastics material. This produces an optimized usability.

It is furthermore advantageous if the second element on a side which is remote from the side on which the at least one spring element is supported, is supported on the first element. The first element then provides the contact face for the second element. The second element is then to a certain extent clamped between the first element and the support region, the at least one spring element providing the corresponding clamping force.

A flexural element may be provided, on which the second part of the sensor arrangement is fixed. For example, forces from the second element may be introduced into the flexural element, the force element bringing about a position change of the second part as a function of the size of the force introduced relative to the first part.

According to the invention, a force measuring arrangement is provided, which comprises a first element, a second element, it being possible for forces to act between the first element and the second element, and a force measuring device according to the invention.

Accordingly, the force measuring arrangement may be implemented on a seat arrangement.

The force measuring device according to the invention may advantageously be used for force determination on a seat, and in particular, a vehicle seat.

The following description of a preferred embodiment is used in conjunction with the drawings, for a more detailed description of the invention.

DETAILED DESCRIPTION OF THE INVENTION

Figure 1:
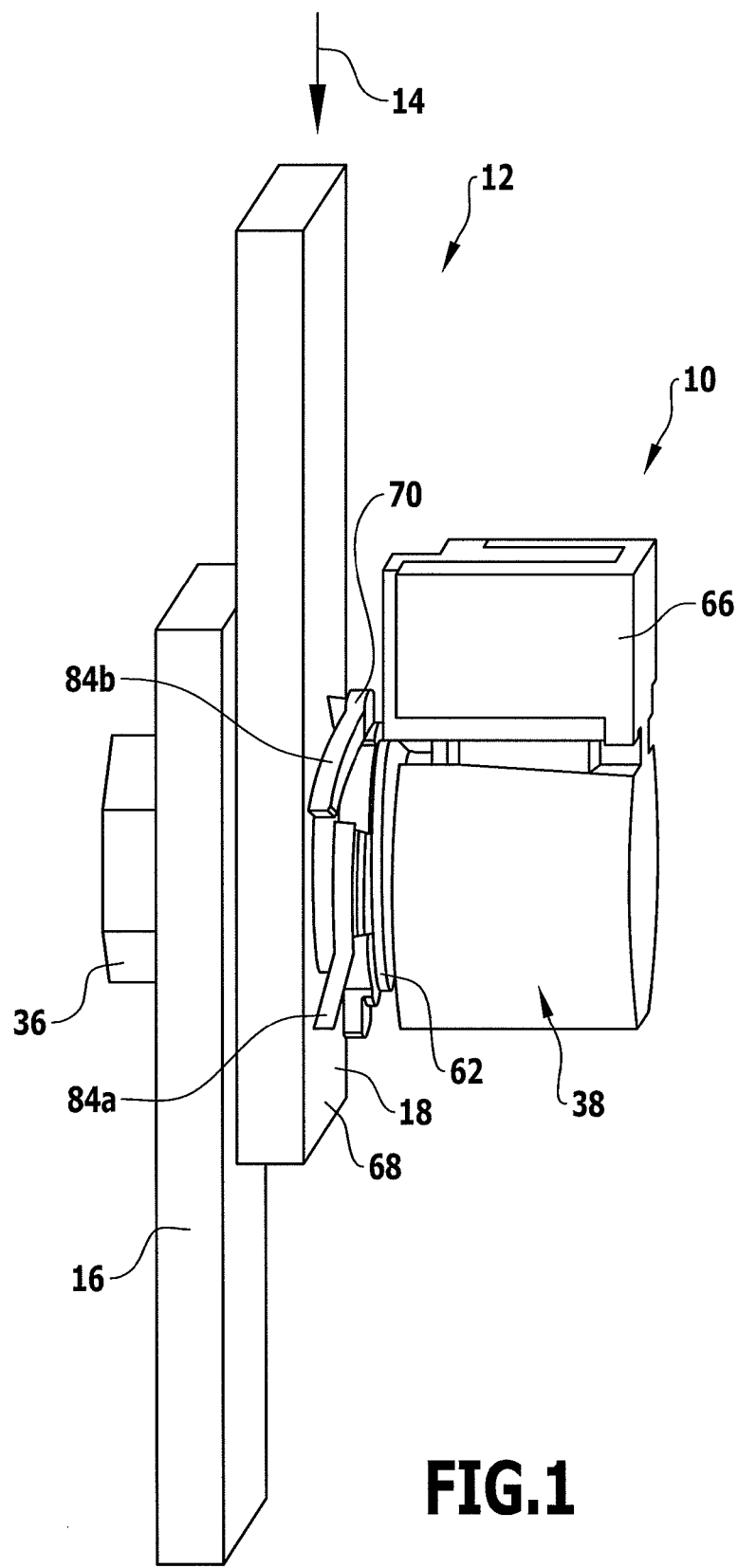
FIG. 1 shows a schematic perspective view of an embodiment of a force measuring device according to the invention, which is assembled on an application.
Figure 2:
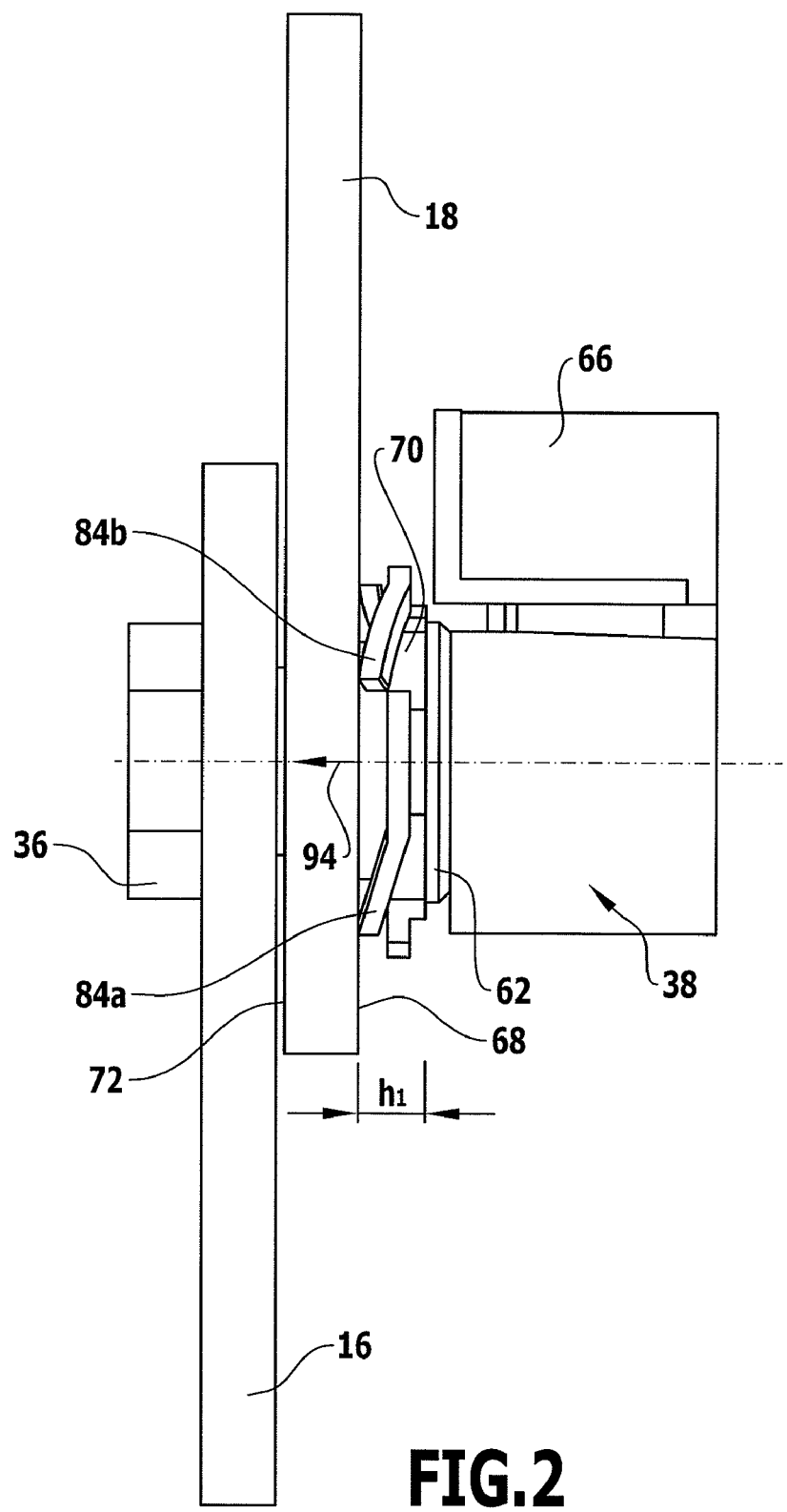
FIG. 2 shows a side view of the force measuring device according to FIG. 1.

An embodiment of a force measuring device according to the invention, which is shown in FIGS. 1, 2, 4 and 5 and designated 10 there, is configured as a force measuring cell. The force measuring device 10 is part of a force measuring arrangement 12, which is used to measure a force 14 between a first element 16 and a second element 18 of an application. The application is, for example, a seat and, in particular, a vehicle seat. The first element 16 and the second element 18 are then frame elements of the seat. The force 14 is, in particular, a weight force, which is exerted on the seat.

The first element 16 is, in particular, a frame element, which is directly or indirectly connected to a vehicle body. For example, the first element 16 is an attachment to a seat rail. The second element 18 is connected to a seat region of the vehicle seat. For example, the second element 18 is a rocker arm of a seat adjuster. Further elements such as, for example, seat rails, may be arranged between the first element 16 and the second element 18.

Figure 4:
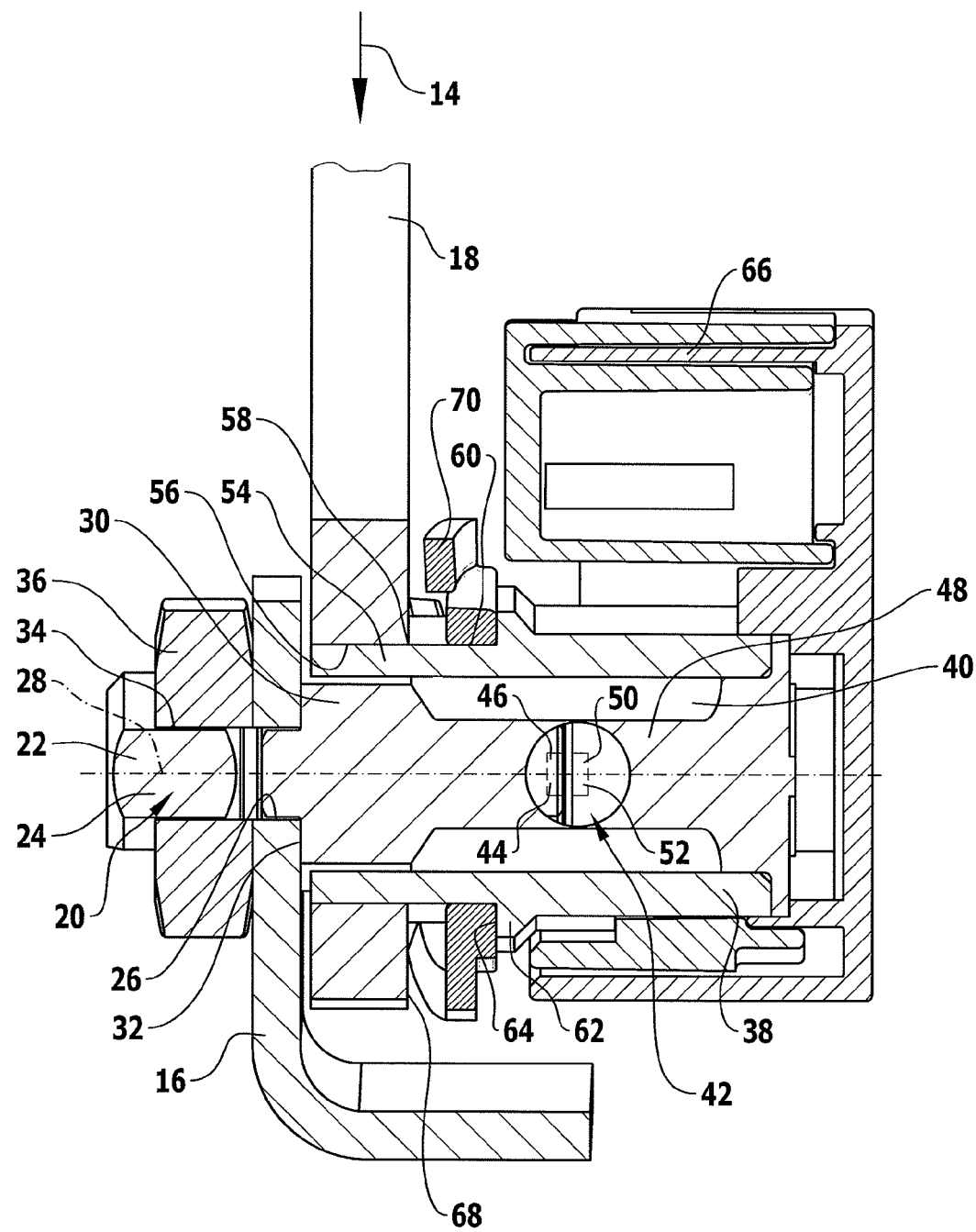
FIG. 4 shows a sectional view of the force measuring device according to FIG. 1 in a first sectional plane.
Figure 5:
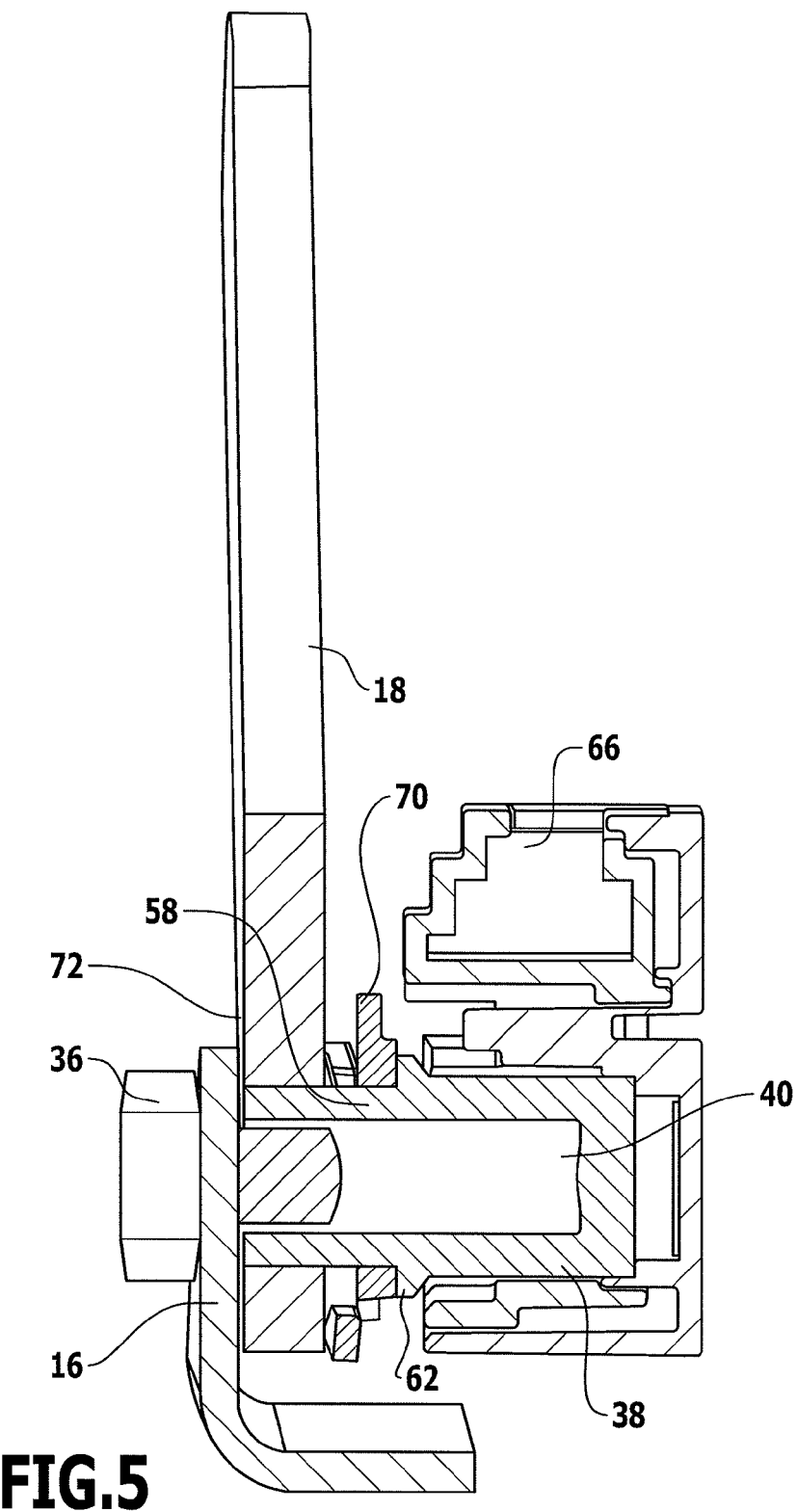
FIG. 5 shows a sectional view of the force measuring device according to FIG. 1 in a second sectional plane.

The force measuring device 10 comprises a force detector 20 (FIGS. 4 and 5). The force detector 20 is provided for fixing to the first element 16. The force detector 20 in turn comprises an assembly part 22 with a cylindrical region 24. The cylindrical region 24 can be inserted from a side facing the second element 18 into an opening 26 of the first element 16 and can be inserted through this opening 26.

The opening 26 may be rotationally symmetrical. It is also possible for it to not be rotationally symmetrical and for the region 24 to be adapted to the corresponding shape of the opening 26 and thus not be cylindrical. As a result, an anti-rotation mechanism may be provided for the assembly part 22 in the opening 26.

Adjacent to the cylindrical region 24, the assembly part 22 has an annular flange 30. This annular flange 30 has a larger diameter than the cylindrical region 24 and a larger diameter than the opening 26. The first element 16 can be placed on a contact face 32, which is annular and has a normal direction parallel to the direction 28, i.e. the flange 30 is used as a contact flange.

An external thread 34 is formed on the cylindrical region 24. Screwed onto the external thread to fix the force measuring device 10 on the first element 16 is a nut 36, by means of which a compressive force can be exerted, which presses the first element 16 against the contact face 32 of the flange 30; the first element 16 can therefore be clamped between the nut 36 and the flange 30.

The force measuring device 10 comprises a housing 38. The housing 38 has an interior 40, in which a sensor arrangement 42 is positioned.

The sensor arrangement comprises a first part 44, which is rigidly connected to the assembly part 22. As a result, the first part 44 of the sensor arrangement 42 can also be coupled to the first element 16.

The first part 44 of the sensor arrangement 42 comprises a pick-up mechanism 46 such as a magnet mechanism with one or more permanent magnets.

A flexural element 48 is arranged on the assembly part 22. This flexural element 48 is hollow cylindrical, for example and, for example, has the shape of a hollow rod, which at least approximately has the shape of a hollow cylinder. The force detector 20 is resiliently deformable by means of the flexural element 48. As a result, the force detector 20 may absorb forces 14, such as, for example, weight forces. The flexural element 48, at a spacing therefrom, surrounds the first part 44 of the sensor arrangement 42.

The flexural element 48 has weakening zones, for example.

The flexural element 48 is connected to a second part 50 of the sensor arrangement 42. The second part 50 of the sensor arrangement 42 comprises a sensor mechanism with one or more sensors, such as, for example, Hall sensors.

The second part 50 of the sensor arrangement 42 is movable relative to the first part 44 by means of the flexural element 48 and the size of the force 14 which is introduced can be determined by means of the relative position of the second part 50 with respect to the first part 44 by a corresponding evaluation of this position.

In the above-described embodiment, the pick-up mechanism 46 is arranged on the first part 44 and the sensor mechanism 52 is arranged on the second part 50 of the sensor arrangement 42. The pick-up mechanism may, in this case, also be arranged on the second part 50 and the corresponding sensor mechanism may then be arranged on the first part 44.

The housing 38 is configured as a force introduction mechanism 54, by means of which a force can be introduced into the flexural element 48.

The second element 18 has an opening 56, through which the housing 38 has entered with a housing region 58. The housing region 58 is an entry region in this sense. When a force 14 acts on the second element 18, this force is transmitted to the housing region 58 of the housing 38 and because of the action as a force introduction mechanism 54, this force acts on the flexural element 48, as a result of which, in turn, a deflection of the second part 50 with respect to the first part 44 takes place. This deflection can be detected by means of the sensor arrangement 42 and the force 14 which has been introduced can thus be quantitatively determined.

Arranged on a casing exterior surface 60 of the housing 38, which is, for example, a cylindrical casing, is a support region 62. The housing region 58 is, in this case, arranged between the support region 62 and one end of the housing 38. The support region 62 surrounds the housing 38 in an annular manner and is, for example, integrally formed on the housing 38. A contact face 64, which is, for example, annular, which faces the second element 18, is provided by the support region 62. This contact face 64 surrounds the housing 38. It has a normal direction, which is oriented at least approximately parallel to the direction 28.

Seated on the outside 60 of the housing 38 is furthermore a plug mechanism 66, to which an external plug can be connected. The sensor arrangement 42 can be supplied with electrical energy by means of this plug. Furthermore, signals of the sensor arrangement 42 can be conducted away.

In the embodiment shown, the plug mechanism 66 is seated next to the housing 38 in a direction transverse to the direction 28. The length of the force measuring device 10 in the direction 28 can thus be kept small.

A spring element 70, which is resilient, is seated between one side 68 of the second element 18, which faces the contact face 64 of the support region 62, and the support region 62. A spring force acts at least approximately parallel to the direction 28.

A side 72 of the second element 18 opposite to the side 68 faces the first element 16. The second element 18 is supported by means of this side 72 on the first element 16. (Because of the specific section, this cannot be seen in FIG. 4, as a region is shown there that is not supported on the first element 16. This support is shown in FIG. 5.)

Figure 3:
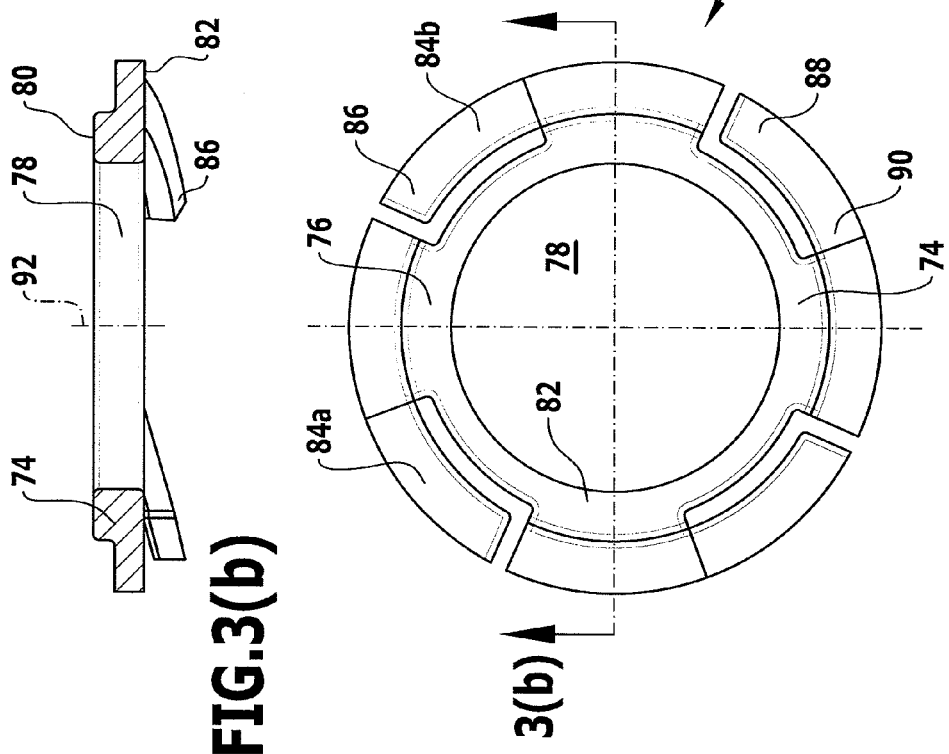
FIG. 3(a) shows a plan view of a spring element of the force measuring device according to FIG. 1.
FIG. 3(b) shows a sectional view along the line 3(b)-3(b) in FIG. 3(a)
FIG. 3(c) shows a side view of the spring element according to FIG. 3(a) in the direction A.

The spring element 70 is configured as an annular element (FIGS. 3(a) to 3(c)) with a carrier 74 which is annular and surrounds an opening 78 with an annular region 76, this opening 78 being circular, in particular. The carrier 74 has a first contact face 80, which is, in particular, flat. The spring element 70 is supported by means of this first contact face 80 on the contact face 64 of the support region 62. Opposite to first contact face 80, the carrier has a second contact face 82 which is preferably also flat. The second element 18 is supported on this second contact face 82 if the spring element 70 is completely resiliently compressed and, in this case, has a minimum height $h_2$ (FIG. 3(c)).

A plurality of fingers 84a, 84b etc. are resiliently arranged on the carrier 74. The fingers project, if no force is exerted on them, beyond the second contact face 82 of the carrier 74. They provide contact faces 86 for the side 68 of the second element 18, by means of which the spring element 70 is supported on the second element 18, if the minimum height $h_2$ is not reached.

The fingers 84a, 84b etc. are preferably arranged uniformly distributed around the periphery of the annular region 76. In the embodiment shown, four fingers are arranged on the carrier 74.

The fingers 84a, 84b etc. have the shape of a ring segment 88. They have a connecting region 90 with the carrier 74. Outside the connecting region 90, they are separated radially and in the peripheral direction from the carrier 74 in order to allow a corresponding possibility of resilient movement in a direction 92. A corresponding axis for the direction 92 in this case passes through a centre point of the opening 78.

If no force is exerted on the spring element 70, the latter has a height $h_1$. By means of the exertion of force, the fingers 84a, 84b are resiliently moved in the direction of the carrier 74, until they are pushed onto or behind the second contact face 82. A corresponding contact face on the spring element 70 is then provided by the second contact face 82.

The resilient movability of the fingers 84a, 84b etc. on the carrier 74 is provided in that the fingers 84a, 84b are resilient per se and/or are connected resiliently by means of the connecting region 90 to the carrier 74.

The spring element 70 is seated on the housing region 58 over the housing 38. The housing is inserted through the opening 78 of the annular region 76. With the force measuring device 10 assembled, the spring element 70 is supported by the first contact face 80 on the support region 62 on the housing 38. The contact faces 86 of the fingers 84a, 84b etc. rest on the side 68 of the second element 18, so the spring element 70 is supported by means of the contact faces 86 on the second element 18. (The spring element 70 may also be assembled turned the other way around, the contact face 80 then being supported on the second element 18.)

The position of the second element 18 on the housing 38 can be varied by the resilient configuration of the spring element 70 during assembly. In different applications, the second element 18 may have different dimensions. Depending on the application, there can be different spacings of the first element 16 and the second element 18. For example, vehicle seats of different manufacturers have different dimensions on components, on which a force measuring device is to be positioned. These different dimensions including manufacturing tolerances can be compensated to a certain extent by the spring element 70. One type of force measuring device can therefore be used for various applications or the same application with different dimensions and/or different spacings.

Figure 6:
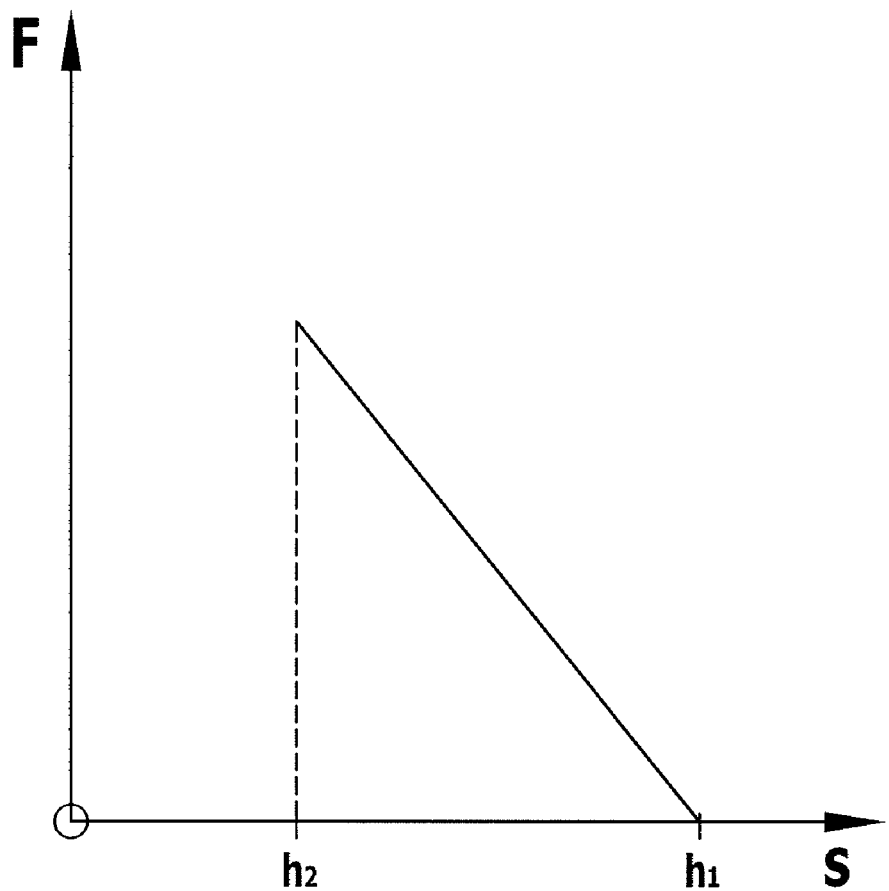
FIG. 6 schematically shows a force/deflection graph for the spring element according to FIG. 3(a).

The spring element 70 is produced from a plastics material. A force (F)/path (s) graph for a spring element 70 according to the invention is indicated schematically in FIG. 6. The path is in this case a compression path proceeding from a maximum height $h_1$. With the spring element 70 positioned, the direction 92 is at least approximately coaxial with the direction 28, in this case. The spring element 70 can be resiliently compressed to the height $h_2$. The use range for the deflection is substantially between $h_1$ and $h_2$. Such variations or tolerances can be compensated by means of the spring element 70.

The difference between the height $h_1$ and $h_2$ is, in particular, in the order of magnitude of between 6 mm and 0.5 mm. In a specific embodiment, $h_1$ is 4.5 mm and $h_2$ is 2.5 mm.

Typical values for the spring constant are in a range between $0.1 \times 10^5$ N/m and $20 \times 10^5$ N/m.

The spring element 70 is a flexible spacer ring (flexible ring). The spring element 70 is open at one side by means of the fingers 84a, 84b etc. In this case, a force-locking connection is achieved, with a tolerance compensation being possible. The pressing of the force measuring device 10 onto the second element 18 (and the first element 16) is not substantially influenced, in this case.

The spring element is preferably adjusted such that an at least approximately constant force is present over the entire (compression) path, i.e. there is a linear dependency.

The force measuring device 10 according to the invention functions as follows:

During the assembly of the force measuring device 10 (with the nut 36 released), the assembly part 22 is inserted with its cylindrical region 24 into the opening 26 of the first element 16. The spring element 70 is, in this case, arranged on the housing 38. In this case, the housing is also inserted with its housing region 58 through the opening 56 of the second element 18.

The nut 36 is placed on the cylindrical region 24 and tightened. The first element 16 in this case acts in the direction 28 on the second element 18 until it strikes against the flange 30. Generally, the second element 18 then abuts directly on the first element 16. Owing to tolerances in the application (for example in a seat construction) the first element 16 may, however, also be oriented at a small acute angle with respect to the second element 18 and abut correspondingly. Depending on the acting force, the spring element 70 is compressed between the second element 18 and the support region 62.

As a result, tolerance compensation can be achieved during the assembly of the force measuring device 10 on a force measuring arrangement. An optimized force-locking connection between the second element 18, the first element 16 and the force measuring device 10 is achieved, the change in the pressing of the force measuring device 10 being minimized.

A force direction 94 of the resilient force of the spring element 70, with which this acts on the second element 18, is, in this case, at least approximately parallel to the direction 28.

Tolerances in the assembly of the force measuring device 10, such as, for example, on a seat application, can easily be compensated by the solution according to the invention.

Basically, the sensor arrangement 42 may be configured in different ways. The force may also be introduced in different ways.

When using the force measuring device 10, if a force 14 is exerted, a relative displacement takes place between the first part 44 and the second part 50 of the sensor arrangement 42. The corresponding relative position of the first part 44 with respect to the second part 50 can be detected and the size of the force 14 can be quantitatively determined thereby by corresponding evaluation.

The invention claimed is:

1. A force measuring device for measuring the force between a first element and a second element of an application, comprising:
   a housing;
   a sensor arrangement, which is arranged in the housing;
   wherein the sensor arrangement comprises a first part and a second part and the force between the first element and the second element determines a relative position between the first part and the second part; and
   at least one spring element, which is positioned between the second element and a support region arranged on the housing, and is supported on the second element and the support region, wherein the at least one spring element has a plurality of resilient fingers, which are arranged on a carrier.

2. The force measuring device according to claim 1, wherein the at least one spring element is configured as a ring which surrounds a housing region.

3. The force measuring device according to claim 2, wherein the housing region is at least partially an entry region into an opening of the second element.

4. The force measuring device according to claim 1, wherein the support region is arranged on an exterior surface of the housing.

5. The force measuring device according to claim 1, wherein the support region is arranged on a lateral surface of the housing.

6. The force measuring device according to claim 1, wherein the support region is arranged surrounding the housing.

7. The force measuring device according to claim 1, wherein the support region has a contact face, which is oriented transverse to a force direction of the at least one spring element.

8. The force measuring device according to claim 1, wherein the at least one spring element has a flat side for resting on the support region or the second element.

9. The force measuring device according to claim 1, wherein the fingers are arranged resiliently on the carrier and/or are resilient.

10. The force measuring device according to claim 1, wherein the fingers have a contact face for the second element or the support region.

11. The force measuring device according to claim 1, wherein the carrier is annular.

12. The force measuring device according to claim 1, wherein the carrier has a first contact face for the support region or the second element.

13. The force measuring device according to claim 12, wherein the carrier has a second contact face, opposite to the first contact face, for the second element or the support region.

14. The force measuring device according to claim 1, wherein the fingers are ring segment-shaped.

15. The force measuring device according to claim 1, wherein the fingers are resiliently movable between a first position, in which the at least one spring element has a maximum height, and at least one second position, in which the at least one spring element has a minimum height.

16. The force measuring device according to claim 15, wherein the spacing between the maximum height and the minimum height is in the range between 6 mm and 0.5 mm.

17. The force measuring device according to claim 1, wherein the at least one spring element has a spring constant in the range between $0.1 \times 10^5$ N/m and $20 \times 10^5$ N/m.

18. The force measuring device according to claim 1, wherein the at least one spring element is produced from a plastics material.

19. The force measuring device according to claim 1, wherein the second element is supported on the first element on a side, which is remote from the side on which the at least one spring element is supported.

20. The force measuring device according to claim 1, wherein a flexural element is provided, on which the second part of the sensor arrangement is fixed.

21. A force measuring arrangement, comprising a first element, a second element, between which forces can act, and a force measuring device for measuring the force between the first element and the second element of an application, said force measuring device comprising:
   a housing;
   a sensor arrangement, which is arranged in the housing;
   wherein the sensor arrangement comprises a first part and a second part and the force between the first element and the second element determines a relative position between the first part and the second part; and
   at least one spring element, which is positioned between the second element and a support region arranged on the housing, and is supported on the second element and the support region, wherein the at least one spring element has a plurality of resilient fingers, which are arranged on a carrier.

22. A force measuring device for measuring the force between a first element and a second element of an application, comprising:
- a housing;
- a sensor arrangement, which is arranged in the housing; wherein the sensor arrangement comprises a first part and a second part and the force between the first element and the second element determines a relative position between the first part and the second part;
- a flexural element, on which the second part of the sensor arrangement is fixed; and
- at least one spring element, which is positioned between the second element and a support region arranged on the housing, and is supported on the second element and the support region.

* * * * *